United States Patent [19]

Suzuki

[11] Patent Number: 4,523,807
[45] Date of Patent: Jun. 18, 1985

[54] METHOD FOR MAKING A MEMBER HAVING MICROSTRUCTURE ELEMENTS ARRANGED THEREON

[75] Inventor: Takashi Suzuki, Yokohama, Japan

[73] Assignee: Canon Kabushiki Kaisha, Tokyo, Japan

[21] Appl. No.: 614,398

[22] Filed: May 25, 1984

Related U.S. Application Data

[63] Continuation of Ser. No. 433,143, Oct. 6, 1982, abandoned, which is a continuation of Ser. No. 108,031, Dec. 28, 1979, abandoned.

[30] Foreign Application Priority Data

Dec. 29, 1978 [JP] Japan ................................. 53-165092

[51] Int. Cl.³ ............................................. G02B 27/00
[52] U.S. Cl. ................................... 350/128; 350/167; 354/200
[58] Field of Search ................ 350/127, 128, 67, 417, 350/431, 162 ZP; 354/200

[56] References Cited

U.S. PATENT DOCUMENTS

| 3,752,555 | 8/1973 | Klotz ........................ 350/162 ZD |
| 3,893,856 | 7/1975 | Bertenreiner et al. .............. 350/147 |
| 3,948,660 | 4/1976 | Deml et al. ......................... 350/417 |
| 3,977,766 | 8/1976 | Langworthy et al. ............. 350/127 |

Primary Examiner—Russell E. Adams
Attorney, Agent, or Firm—Fitzpatrick, Cella, Harper & Scinto

[57] ABSTRACT

Method for a member having microstructure elements arranged thereon. Three or more coherent beams are projected on a recording material from finite angular directions relative to each other to form a pattern on the recording material. The pattern recorded on the recording material is subjected to a developing treatment to obtain microstructure elements.

11 Claims, 9 Drawing Figures

METHOD FOR MAKING A MEMBER HAVING MICROSTRUCTURE ELEMENTS ARRANGED THEREON

This application is a continuation of application Ser. No. 433,143 filed Oct. 6, 1982, now abandoned, which in turn is a continuation of application Ser. No. 108,031, filed Dec. 28, 1979, now abandoned.

BACKGROUND OF THE INVENTION

1. Field of the Invention

The present invention relates to a method for making a member having microstructure elements arranged thereon by forming a pattern having two-dimensional periodically in air and optically recording the pattern. The optical recording process in the method includes not only the recording by visible light but also recording by lights other than visible light. Such member having microstructure elements arranged thereon is hereinafter referred to as microstructure member for the purpose of simplification of description. Examples of the microstructure member to which the present invention is pertinent are microrelief structure, micromesh structure and the like. These microstructure members are useful for many purposes in optical, chemical, printing and machinery industries. For example, they are used as a focusing plate in camera. Also, they can be used as a particle size selection filter for a polishing agent and a dotted mesh screen in printing. In this specification, the manufacturing method of such microstructure member and its use will be described particularly in connection with those microstructure members which are preferably used in the technical field of optics.

2. Description of the Prior Art

Examples of the microstructure member well-known in the optical art are fly's eye lenses and microprisms which are used in cameras as finder screen and focusing plate and in image projecting apparatus as projector screen. Other uses of the microstructure member can be found also in illumination apparatus and data processing apparatus.

Recently it has been found that the diffusion plate generally used in optical apparatus, in particular, in cameras has an important disadvantage of insufficient brightness and therefore in the art many attempts have been made to improve the diffusion plate. As an solution to the problem it has been proposed to use a fly's eye lens as finder screen in camera. However, in this case, it is required that the individual lens elements of one fly's eye lens should have each a very small diameter in the order of $10\mu$ or less, for the reason described later herein. At present, there is no method available for making a fly's eye lens composed of such fine lens elements. Under the standard of the prior art, therefore, any fly's eye screen for use in camera has not yet been realized.

SUMMARY OF THE INVENTION

Accordingly, it is an object of the invention to provide a method which makes a fly's eye lens screen with an arrangement of very fine lens elements as mentioned above.

It is another object of the invention to provide a method which makes an image projection screen provided with well controlled diffusion characteristics.

It is a further object of the invention to provide a method which makes a screen having rotation asymmetrical diffusion characteristics in a very simple manner.

It is still a further object of the invention to provide a method which makes a screen with an arrangement of microstructure elements having a two-dimensional regularity.

Also, it is another object of the invention to provide an image projection apparatus in which the above arrangement of microstructure elements with a certain periodicity is used as its projection screen and which is provided with means for preventing adverse effect on the associated image observation system by noise of moiré fringe which often appears in such apparatus.

It is still a further object of the invention to provide a method which makes microstructure members with an arrangement of microstructure elements each having a size in the order of $\mu$ such as mesh screens which are useful not only for the optical industry but also for various other industrial fields.

Other and further objects, features and advantages of the invention will appear more fully from the following description taken in connection with the accompanying drawings.

DESCRIPTION OF THE PREFERRED EMBODIMENTS

At first, a process for making a screen having a microstructure like a fly's eye lens according to the first embodiment of the invention will be described with reference to FIG. 1.

Figure 1:
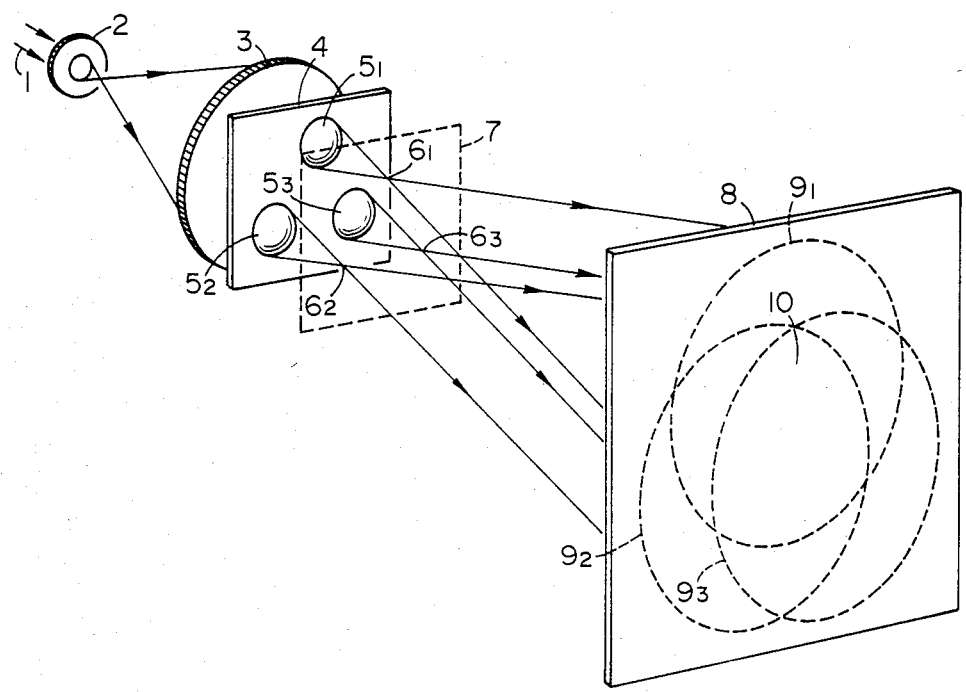
FIG. 1 schematically shows an example of pattern generating and recording apparatus used to make a microstructure member in accordance with the invention.

In FIG. 1, a laser beam is designated by 1 and a beam expander optical system by 2 and 3. Designated by 4 is a lens holder supporting three convex lenses $5_1$, $5_2$ and $5_3$. Real spot light sources coming out from the three convex lenses are disignated by $6_1$, $6_2$ and $6_3$ respectively. As suggested by the phantom 7, in the plane containing the three spot light sources there may be disposed a filter having small openings slightly larger than the spot light sources to eliminate noise which may be produced by dirt and other foreign matters on the lenses.

Figure 2:
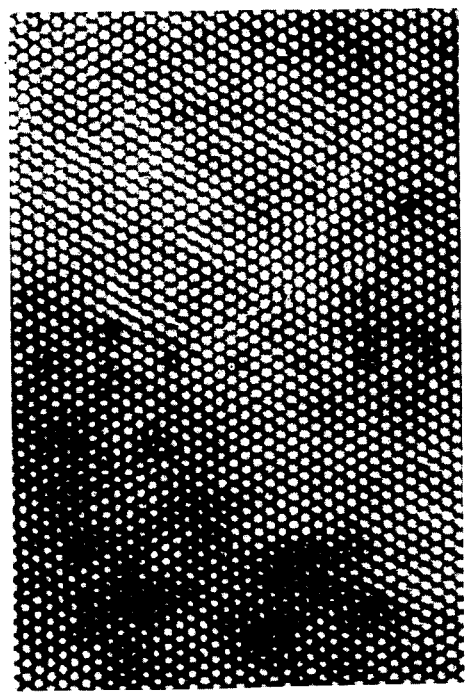
FIG. 2 shows an example of patterns formed using the apparatus.

Designated by 8 is a recording material on which diverged beams $9_1$, $9_2$ and $9_3$ from the above three spot light sources are projected. At the area 10 where the three beams overlap each other, there is produced an interference fringe resulting from interference of three beams. In the embodiment shown in FIG. 1, three spot light sources $6_1$, $6_2$ and $6_3$ lie nearly at three vertexes of a regular triangle. The interference pattern has a two-dimensional periodicity as seen from FIG. 2. However, since FIG. 2 is a photograph directly taken using a microscope without any noise filter 7, some interference noises are superimposed on the interference pattern. This is applied also to photographs of FIGS. 4–6 later shown.

The interference pattern is recorded on a silver salt emulsion dry plate and subjected to a known bleaching treatment. By this treatment, the intensity distribution of the light is transformed into a relief pattern of the gelatin layer. Thus, a kind of fly's eye lens is obtained which is composed of closely arranged fine lens elements. Such a relief pattern structure can be reproduced in mass production process employing any suitable one of various known copying methods.

When the interference pattern shown in FIG. 2 is recorded on another recording material well-known in the art of IC pattern recording, that is, such recording material as prepared by applying a layer of photo soluble type resist or a chrome coated glass, there is obtained a network structure complementary to the interference pattern after the steps of developing and etching. In this case, by substituting a thin metal sheet for the vapour deposited film of chrome there is obtained a complete member of micromesh structure in a very simple manner.

As the recording material 8 there may be also used photopolymer, thermoplastics, dichromated gelatin and chalcogen glass according to the wavelength of light source then used and the purpose for which the microstructure member is intended. The microstructure obtainable by using the above recording materials is not limited only to a periodical relief structure. By suitably selecting the treatment process for the selected material, the microstructure may be formed also as an internal refractive index distribution.

In the interference pattern generating apparatus shown in FIG. 1, the lenses $5_1$–$5_3$ may be replaced by convex lenses. Similarly, the beams used to form the interference fringe is never limited to diverging beams only. Converging beams and parallel beams may be used for the same purpose. Even such beams containing some aberration also may be used provided that the aberration can not introduce into the interference pattern any irregularity in period.

Figure 3:
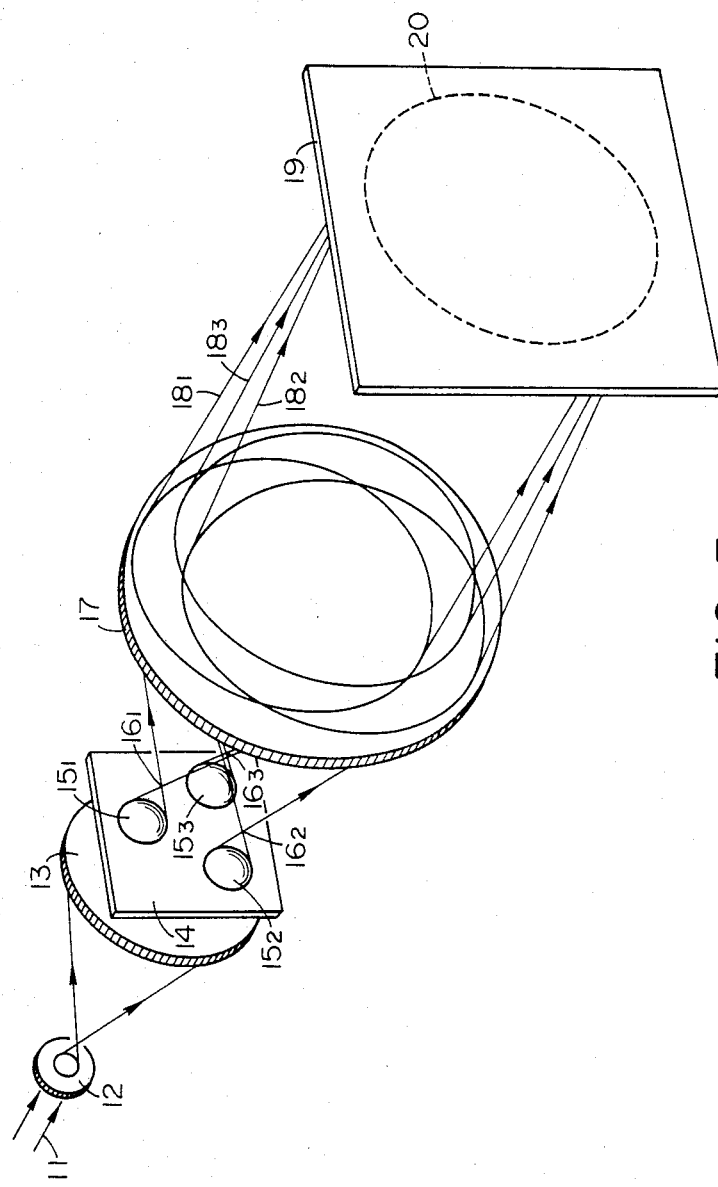
FIG. 3 schematically shows an example of pattern generating and recording apparatus useful for making a microstructure member without distortion.

In particular, according to the process illustrated in FIG. 1 there produced interference patterns having therein some distortion. Therefore, when it is desired to obtain a pattern free of distortion throughout the wide area, it is preferable to make plane waves interfere each other. FIG. 3 shows an optical system by which three plane waves can be obtained in a relatively simple manner although there is the possibility of some aberration.

In FIG. 3, reference numeral 11 designates a laser beam, 12, 13 are a beam expander optical system and 14 is a lens holder for lenses $15_1$–$15_3$. Real spot light sources coming out from the three lenses are designated by $16_1$, $16_2$ and $16_3$ respectively. The plane defined by these three points $16_1$, $16_2$ and $16_3$ is coincident with the focal plane of lens 17. Therefore, three parallel beams $18_1$, $18_2$ and $18_3$ emerge from the lens 17 and are incident upon a photorecording material 19.

It is possible to make the three beam projection areas overlapping in an area 20 on the recording material by suitably adjusting the distance between two lenses 12 and 13. Also, the size of individual patterns in FIG. 2 can be controlled easily by changing the distance between spot light sources and/or the distance between the plane containing spot light sources and the recording material. In this manner, patterns of about $1\mu$ in size can be obtained without difficulty.

A beam splitter or various prisms may be also used as means for obtaining the necessary beams in the shown apparatus.

While a triangular arrangement of spot light sources has been particularly shown in FIGS. 1 and 3, the manner of arrangement of spot light sources may be modified in various ways. For example, a plural number of spot light sources may be arranged to form a diamond, a rectangle or two or more triangles. Also, they may be arranged to lie on one or more circles or ellipses. A point symmetrical arrangement also may be used provided that the arrangement includes at least two sets of spot light sources, each set containing two spot light sources symmetrically arranged relative to a point. It is not always necessary to arrange the spot light sources regularly as mentioned above. Without departing from the scope of the invention an irregular arrangement of spot light sources also may be used so long as the interference pattern obtained thereby has a periodicity. An example of such irregular arrangement is shown in FIG. 8.

Figure 8:
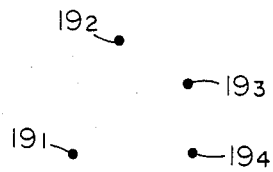
FIG. 8 shows an example of irregular arrangement of spot light sources.
Figure 9:
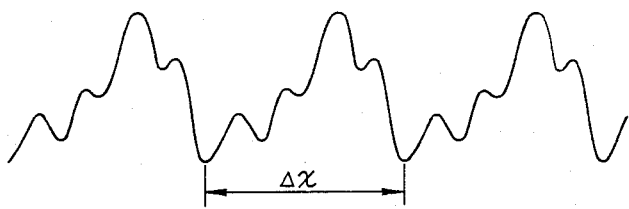
FIG. 9 shows the intensity distribution on the screen prepared by using the arrangement of spot light sources shown in FIG. 8.

In FIG. 8, the four spot light sources $19_1$ to $19_4$ are arranged irregularly. However, as seen from FIG. 9, the intensity distribution of light resulting therefrom has a regularity as viewed in a linear direction. While the distribution curve shown in FIG. 9 has no regularity within the span of x, it has a periodic structure of x when viewed at a larger scale.

Figure 4:
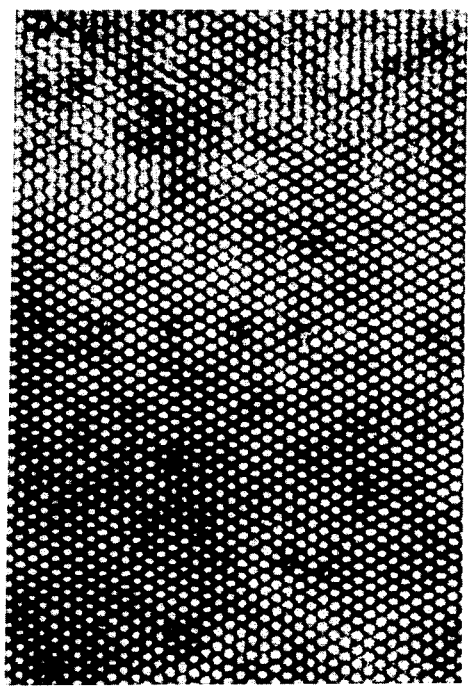
FIG. 4 shows a pattern as obtained when the apparatus shown in FIG. 1 is modified by altering the arrangement of spot light sources from triangular to diamond.
Figure 5:
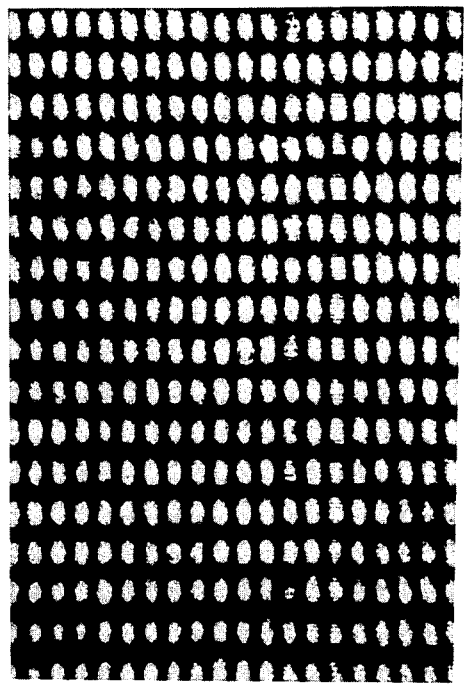
FIG. 5 shows a pattern as obtained when the apparatus shown in FIG. 1 is modified by altering the arrangement of spot light sources from triangular to rectangular.

By employing a diamond-wise regular arrangement there is obtained a two-dimension periodic interference pattern as shown in FIG. 4. Individual pattern elements in the interference pattern have a diamond shape with the corners being cut off, which, as a whole, approximates an ellipse. When a rectangular arrangement is used, there is obtained a two-dimension periodic pattern as shown in FIG. 5. As seen from FIG. 5, the interference pattern is composed of a number of pattern elements in a form of rectangle each with its corners being cut off. Similarly, the pattern obtained by employing a square arrangement is composed of a number of pattern elements each being in a form of a square with its corners being cut off.

As will be understood from the foregoing, according to the method of the present invention, the size, shape and distribution of the interference pattern to be produced can be controlled in a very simple manner by changing the arrangement of spot light sources used. Therefore, various screens having well-controlled diffusion characteristics can be obtained by transforming the interference pattern into a corresponding relief pattern employing a known recording method suitably selected from the group consisting of the silver salt bleaching method, photoresist method, thermoplastic method and other known methods. Thus, the present invention provides many types of screens which have been longed for in the technical field of image projection, that is, screens having well-limited directivity, screens having rotation asymmetric diffusion characteristics and so-called clear screens having a relatively low degree of granulation.

Patterns as shown in FIGS. 4 and 5 which have different fundamental frequencies in the longitudinal direction and in the transverse direction are particularly suitable for making screens having rotation asymmetric diffusion characteristics. These screens can be used advantageously in a camera of the type in which photometry is carried out making use of a portion of the diffused light from a finder screen or in projector screens in which a lower diffusion is desired in the longitudinal direction and a higher diffusion is desired in the crosswise direction.

However, screens prepared from those periodic structure patterns as shown in FIGS. 2, 4 and 5 may bring forth a problem in particular when they are used in an image projection apparatus. If the image to be projected contains therein any periodic pattern, then there is the possibility that a moiré fringe may be produced as a result of interference between the periodic pattern belonging to the image and the periodic pattern belonging to the screen. A typical example of such phenomenon which we have often experienced is a moiré fringe appearing on the picture screen of a color television set. For example, when a person appearing on the television wears a checker-patterned dress, there appears a moiré fringe as a result of interference between the matrix structure of the color television shadow mask and the pattern of the dress. In this case, we can not get a good picture there. A solution to this problem of occurrence of moiré fringe is to eliminate the periodic structure from the screen. This may be accomplished by reducing the optical quality of arrangement of spot light sources. According to the embodiments using the arrangements of spot light sources described above which are all of high quality, there are obtained patterns having two-dimensionally periodic structures as shown in FIGS. 2, 4 and 5. Therefore, to eliminate the periodic structure from the screen, the quality of arrangement in the optical sense has to be reduced to some extent. Means for attaining the object is shown in FIG. 7.

Figure 6:
FIG. 6 shows a pattern as obtained when the apparatus shown in FIG. 1 is modified by altering the arrangement of spot light sources from triangular to double ring form.
Figure 7:
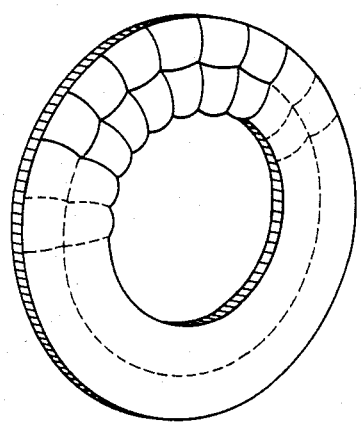
FIG. 7 shows the spot light source generating apparatus used for obtaining the pattern shown in FIG. 6.

The structure shown in FIG. 7 is of a plastic lens arrangement commonly used for an exposure meter mounted in a camera. Spot light sources are arranged on a double ring. FIG. 6 shows a pattern as obtained by this arrangement shown in FIG. 7. In macroscopic view, this arrangement of lens elements has a regularity. However, when viewed in an extremely small scale in the order of a wavelength, it has irregularity with respect of quality of lens material, configuration of lens surface, spacing between each two neighboring lenses, etc. Therefore, as seen in FIG. 6, the interference pattern obtained by this arrangement is irregular and is a kind of speckle pattern.

The problem of moiré fringe mentioned above can be solved or minimized in another way without eliminating the periodic structure from the screen.

Another embodiment of the invention is directed to such an image projection apparatus in which no moiré fringe is observed between the projected image and projection screen, or moiré fringe, if any, is made almost unnoticeable even when a screen having a periodic structure as described above is used in the apparatus. This embodiment is described hereinafter particularly in connection with a finder screen of a camera.

For a single eyed reflex camera, the diaphragm value of the lens that is most frequently used is F/5.6 or a value near it. The ideal resolving power on the image plane at F/5.6 is about 300 lines/mm. However, as regards the in-air image at its finder, the resolving power is generally reduced to half, namely to about 150 lines/mm due to the influences of aberration introduced by the quick-return mirror, brightness and contrast of the object or other similar factors. On the other hand, magnification of the finder optical system is in the order of ×5. Therefore, provided that the resolving power of human eye at the distance of distinct vision is 10 lines/mm, the resolving power of the finder optical system including the eye to the pattern on the screen is 50 lines/mm.

The above means that if the spatial frequency of a moiré fringe which may appear on the image plane is higher than 50 lines/mm, then the moiré fringe is not observable. Therefore, when the screen has a periodic structure greater than 200 lines/mm, no moiré fringe becomes observable because the difference between the periodic structure and the maximum spatial frequency of periodic structure an image may have, that is, 150 lines/mm is larger than 50 lines/mm. From the fact it is concluded that the pitch of periodic structure required for a single eyed reflex camera's finder screen is theoretically about 5$\mu$. However, in practice, a larger pitch is allowable and about 10$\mu$ is sufficient for the purpose. Finder screens are usually of the phase type and in many cases it can not occur that the finder screen itself becomes observable as a distribution of dark and light so long as the lens is bright. Even if the aperture is stopped down to a position in which a dark and light distribution may appear, the contrast between a light portion and dark portion is very low. Therefore, when the pitch is about 10$\mu$, there is practically no need to worry about the occurrence of moiré fringe at any diaphragm value.

As will be understood from the foregoing, the method of the present invention permits the design and manufacture of optimum screens for various image projection apparatus. Furthermore, according to the method of the invention, more minute, more precise and more broadened real mesh screens useful for chemical, printing machinery and other industrial fields can be obtained. It is evident that the present invention makes a valuable contribution to the art.

What I claim is:

1. A method of making a microstructure member, comprising:
    providing light beams which are emitted from an arrangement of two or more light sources and which are interferable with one another;
    superposing the light beams axially without re-imaging to produce equally spaced interference fringes having two-dimensional monotonous periodicity; and
    exposing a recording medium to the produced interference fringes with a fixed relative position between the interference fringes and the recording medium.

2. A method according to claim 1, wherein said light source arrangement includes three point light sources for emitting beams which are interferable with one another, said three point light sources being located on a circle.

3. A method according to claim 1, wherein said light source arrangement includes three point light sources for emitting beams which are interferable with one another, said three point light sources being located on an ellipse.

4. A method according to claim 1, wherein said light source arrangement includes three point light sources for emitting beams which are interferable with one another, said three point light sources being located at apexes of a substantially equilateral triangle.

5. A method according to claim 1, wherein said light source arrangement includes four point light sources for emitting beams which are interferable with one another, said four point light sources being located on a circle.

6. A method according to claim 1, wherein said light source arrangement includes four point light sources for emitting beams which are interferable with one another, said four point light sources being located on an ellipse.

7. A method according to claim 1, wherein said light source arrangement includes four point light sources for emitting beams which are interferable with one another, said four point light sources being located at apexes of square.

8. A method according to claim 1, wherein said light source arrangement includes four point light sources located at apexes of lozenge.

9. An image projection screen, such as a focussing screen of a camera produced by a method according to any one of claims 1 through 8, wherein the microstructure is of a relief type.

10. An image projection screen having a microstructure member prepared by the method according to any one of claims 9 through 8, wherein said microstructure member has a periodic structure (ls/mm), and the resolving power (li/mm) of a projected image on said screen and the resolving power (lo/mm) of a projected image observation system to the pattern on said screen are related according to:

$$lo \approx ls \sim li \text{ (difference between ls and li)} \quad (1)$$

or $$lo > ls \sim li \quad (2).$$

11. A microstructure member produced by a method according to any one of claims 1 through 8, which has a mesh structure through which a material is passed.

* * * * *

UNITED STATES PATENT AND TRADEMARK OFFICE
CERTIFICATE OF CORRECTION

PATENT NO. : 4,523,807
DATED : June 18, 1985
INVENTOR(S) : TAKASHI SUZUKI

It is certified that error appears in the above-identified patent and that said Letters Patent is hereby corrected as shown below:

Column 8, line 10, change "Claims 9 through 8" to -- Claims 1 through 8 --.

Column 1, line 16, change "periodically" to -- periodicity --.

Column 1, line 49, after "As" change "an" to -- a --.

Column 2, line 66, change "disignated" to -- designated --.

Column 3, line 32, after "resist" change "or" to -- on --.

Column 6, line 27, after "From" change "the" to -- this --.

Column 6, line 37, after "between" change "a" to -- the --.

Signed and Sealed this

Fifteenth Day of July 1986

[SEAL]

Attest:

DONALD J. QUIGG

Attesting Officer

Commissioner of Patents and Trademarks